March 26, 1940.  T. A. JOHNSON ET AL  2,195,007
LAND CLEARING AND STRIPPING SHOVEL
Filed March 1, 1938  2 Sheets-Sheet 1
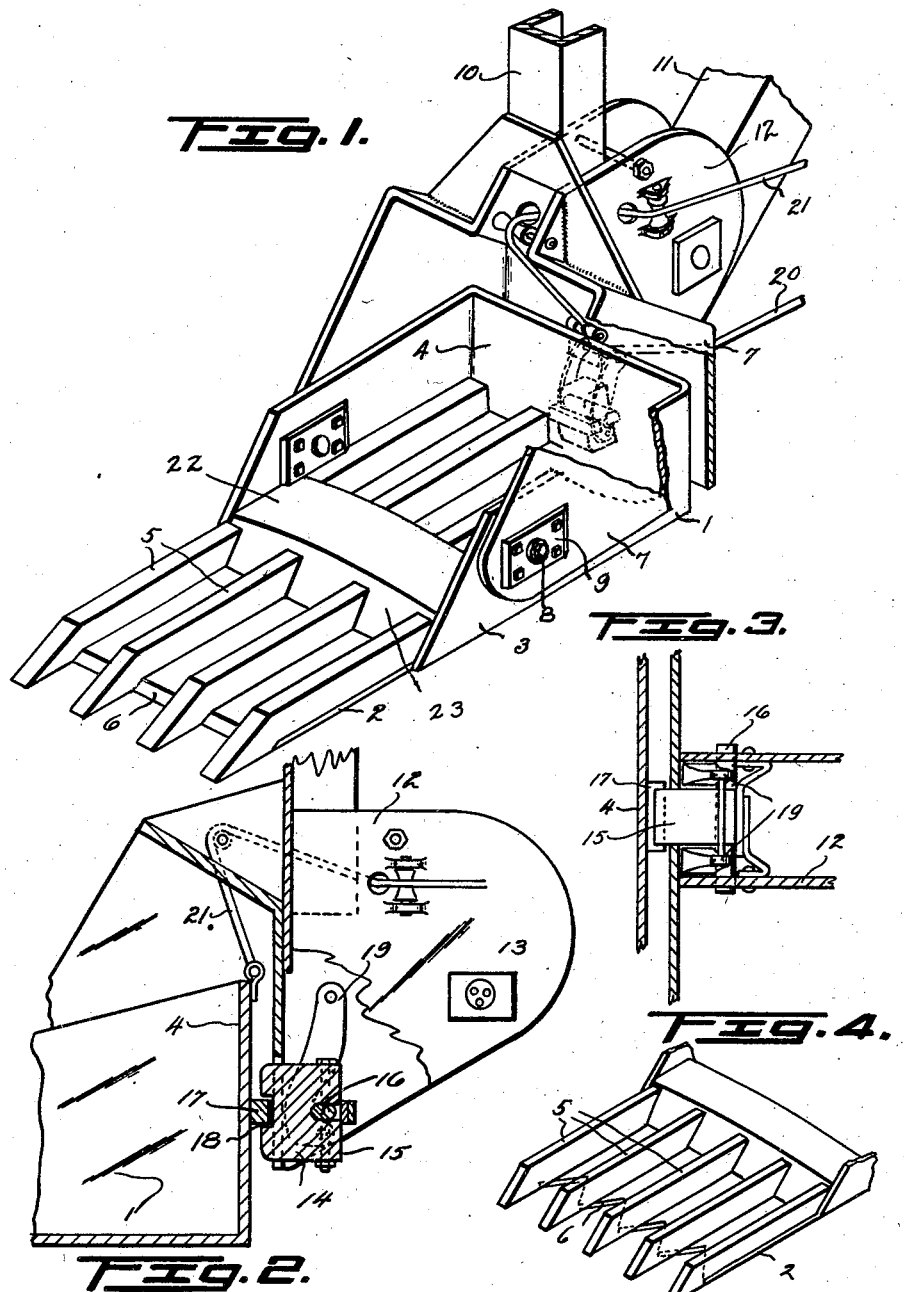
INVENTORS
John Thompson
Thomas A. Johnson
Charles G. R. McHardy.
BY
ATTORNEYS Inventors,
T. A. JOHNSON
JOHN THOMPSON
C. G. R. McHARDY Patented Mar. 26, 1940

2,195,007

UNITED STATES PATENT OFFICE 2,195,007

LAND CLEARING AND STRIPPING SHOVEL

Thomas Alexander Johnson, Hearst, Ontario, and Charles G. R. McHardy and John Thompson, Toronto, Ontario, Canada Application March 1, 1938, Serial No. 193,326

8 Claims. (Cl. 214—136)

Our invention relates to an improved power operated shovel which is particularly adapted for clearing land for agricultural purposes, road beds and the like in addition to the usual uses of such a shovel.

One of the features of our invention resides in the novel arrangement of parts whereby we effect the forward dumping of the scoop bucket rather than emptying it by permitting the material to drop out of the rear of the scoop as has been the usual practice heretofore.

A further feature of our invention resides in the novel shovel suspension arrangement by means of which the shovel may be kept at all times ahead of the pusher shaft which permits the operation of the shovel in places which heretofore have had to be cleared before the shovel could be put into operation.

Still further features reside in the novel latching arrangement by means of which the shovel is held rigidly in fixed position while scooping up its load and is easily tripped for dumping either by the weight of the load or by raising the rear end of the bucket.

The manner in which we attain the features of our invention will be apparent from the following description and accompanying drawings in which like reference characters refer to like parts throughout.

Figure 1 is a perspective view of a power operated shovel embodying our invention.

Figure 2 is a side elevation of the bucket, fixed frame and latching device.

Figure 3 is a side elevation of the latching device with the tripping cams removed.

Figure 4 is a top plan view of an alternative arrangement of the bottom plate of the bucket.

Figure 5:
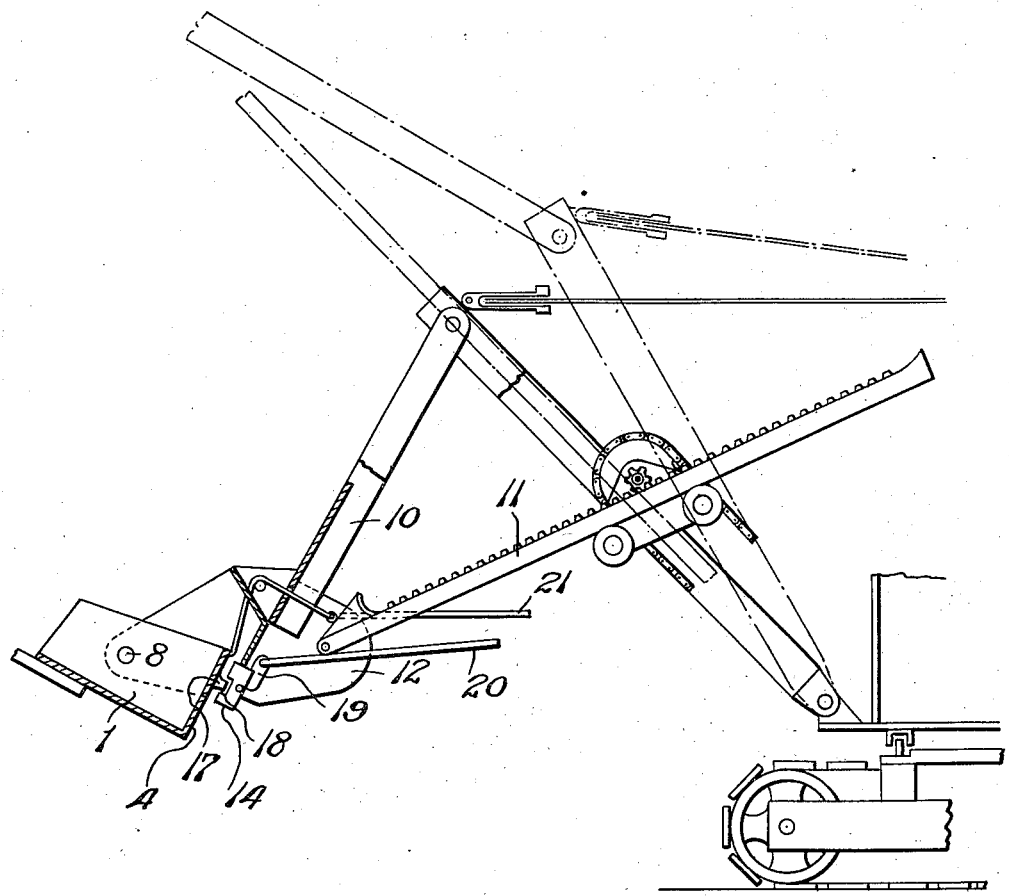
Figure 5 is a side elevation of a power operated shovel constructed in accordance with our invention.

In the preferred embodiment of our invention described and illustrated herein, the numeral 1 indicates the forward dumping bucket formed with bottom plate 2, side plates 3 and rear plate 4. The plates 2, 3 and 4 may be of one piece, formed from material having sufficient tensile strength to withstand the strains to which the bucket is subjected, or may be of individual pieces bolted, welded or riveted together.

The teeth 5 are secured to the bottom plate 2 and extend outwardly from the forward end thereof. We prefer to have the teeth separable from the bottom plate 2 and also to have the front end 6 of the bottom plate 2 separable from the main body thereof in order to use a design of plate and teeth most suitable for the land being cleared. For example, the straight plate shown in Figure 1 is most adaptable for use in soft ground whereas, the saw tooth plate shown in Figure 4 is most suitable for stumps, underbrush and the like.

The bucket 1 is mounted on the fixed frame 7 by means of the trunnions 8 housed in bearings 9 provided on the sides of the fixed frame and the side plates 3 of the bucket.

The fixed frame 7 is rigidly secured to the shovel link 10 and to the power boom 11. One end of the shovel link 10 is held firmly in the block 12 provided on the rear of the fixed frame 7 while the other end is pivotally secured to the end of the main boom. The pusher shaft 11 is pivotally secured to said block by means of the pin 13. Both the shovel link 10 and pusher shaft 11 are formed of material such as square-iron.

The latching device 14 comprises the forging 15, movably mounted on the steel bar or rod 16. The bar 16 is secured to the rear of the fixed frame 7 and extends slightly outward therefrom.

The front face of the forging 15 is shaped to receive the lug 17 affixed to and projecting from approximately the centre of the rear wall 4 of the bucket 1.

The forging 15 is secured to the bolt 16 in such a manner that a slight horizontal movement of the two is permitted, sufficient to bring the opening 18 into and out of engagement with the lug 17. The movement of the forging 15 is effected by means of the trip 19 operated from the cab of the shovel by means of the trip line 20.

In order to facilitate the dumping of the bucket on release of the latch 14, we further provide a dump line 21, one end of which is secured to the upper part of the rear wall 4 of the bucket 1 and the other end to a power operated drum (not shown) provided in the cab of the shovel.

The bottom plate 2 is reinforced, preferably at its mid-section, by the cross member 22. The cross member 22 is preferably arched by forming it in such a manner that the cross section is greatest where the stresses on the shovel tend to buckle the bottom plate 2, that is, across the centre thereof. The cross member 22 is formed with downwardly extending portions adapted to fit snugly between the teeth 5 and are preferably countersunk into the bottom plate 2 to prevent foreign material from getting under the cross member 22 during the operation of the shovel.

In actual use, we have found our forward dumping shovel to be a distinct improvement over the rear dumping shovels commonly used.

For example, with this shovel it is possible to clear land on which are stumps, underbrush and small trees. Heretofore, it has been necessary to remove this material prior to operating the shovel inasmuch as the material could not be dumped from the bucket through the opening provided in the rear wall.

As a further advantage, the feature of being able to have the shovel ahead of the pusher shaft is a distinct advantage as it is possible to operate our shovel in confined places where the ordinary shovel would not be able to operate.

In addition, the novel arrangement of the shovel link fulcrumed to the main boom is an added advantage which permits a more precise control over the shovelling operation than can be obtained by suspending the shovel from cables and actuating it by combined manipulation of the pusher shaft and control cables. The advantages of this arrangement are particularly apparent when working the shovel on land covered with underbrush and the like which would become entangled with the cables thus hindering, if not actually preventing the operation of the shovel.

Having thus fully described our invention, what we claim as new and desire to secure by Letters Patent is:

1. A bucket assembly of the class described comprising a fixed frame having side portions and a rear portion, a scoop bucket mounted for vertical movement between said side portions, said scoop bucket having a bottom section, side walls and a rear wall, means for raising the rear end of said scoop bucket to effect the forward dumping thereof, means for holding said scoop bucket firmly in fixed position during the shovelling operation which comprises a lug projecting rearwardly from the rear wall of said scoop bucket, a forging, one face of which is shaped to receive said lug, affixed to the rear portion of said fixed frame, and means for bringing said forging into and out of engagement with said lug, means for actuating said fixed frame comprising a rigid vertical member secured at one end to said fixed frame and fulcrumed to the main shovel boom at the other end and a power boom pivotally secured at one end to the fixed frame and at the other end to shovel operating mechanism.

2. In a power shovel of the class described, a shovel link, the upper end of which is pivotally secured to a main boom and the lower end is rigidly secured to a fixed frame, said fixed frame being provided with side and rear walls, a scoop shovel mounted for vertical movement between the side walls of said fixed frame, said scoop bucket having a bottom section, side walls and a rear wall; a pusher shaft pivotally secured to said fixed frame; means for holding said scoop shovel firmly in said fixed frame during the shovelling operation; means for releasing said scoop shovel from its fixed position in said fixed frame and means for actuating said pusher shaft.

3. In a power shovel of the class described, a shovel link, the upper end of which is pivotally secured to a main boom and the lower end is rigidly secured to the rear wall of a fixed frame, said fixed frame having side and rear walls; a scoop shovel mounted for vertical movement between the said walls of said fixed frame, said scoop shovel having a strongly reinforced bottom section, side walls and a rear wall; a pusher shaft pivotally secured to the rear wall of said fixed frame; means for holding said scoop shovel firmly in said fixed frame during the shovelling operation; means for releasing said scoop shovel from its fixed position in said fixed frame and means for actuating said fixed frame and means for actuating said pusher shaft.

4. In a power shovel of the class described, a shovel link, the upper end of which is pivotally secured to a main boom and the lower end is rigidly secured to the rear wall of a fixed frame, said fixed frame having side walls and rear wall, a U-shaped block secured to the rear wall of said fixed frame and extending rearwardly from said frame adapted to receive the end of said shovel link, and means for holding said shovel link firmly in fixed position therein; a scoop shovel mounted for vertical movement between the side walls of said fixed frame, said scoop shovel having a strongly reinforced bottom section, side walls and a rear wall; a pusher shaft pivotally secured between the side walls of the aforesaid U-shaped block; means for holding said scoop shovel firmly in said fixed frame during the shovelling operation; means for releasing said scoop shovel from its fixed position and means for actuating said pusher shaft.

5. In a power operated shovel of the class described, a shovel link, the upper end of which is pivotally secured to a main boom and the lower end is rigidly secured to a fixed frame formed with side members, a shovel mounted for vertical movement in said fixed frame, movable pusher shaft means adapted to actuate said shovel link, means for locking said shovel in fixed position during each shovelling operation and means for emptying the contents of said shovel.

6. In a power operated shovel of the class described, a shovel link, the upper end of which is pivotally secured to a main boom and the lower end is rigidly secured to a fixed frame formed with side members, a shovel mounted for vertical movement in said fixed frame, movable pusher shaft means adapted to actuate said shovel link, means for locking said shovel in fixed position during each shovelling operation, and means for effecting the forward dumping of said shovel.

7. In a power shovel of the class described, a shovel link, the upper end of which is pivotally secured to a main boom and the lower end is rigidly secured to a fixed frame formed with side members, a shovel mounted on trunnions journalled in said fixed frame, movable pusher shaft means adapted to actuate said shovel link, means for locking said shovel in fixed position during each shovelling operation and means for releasing said locking means.

8. In a power shovel of the class described, a shovel link, the upper end of which is pivotally secured to a main boom and the lower end is rigidly secured to a fixed frame formed with side members, a shovel mounted for vertical movement in said fixed frame, movable pusher shaft means adapted to actuate said shovel link pivotally secured to said shovel link, means for locking said shovel in fixed position during each shovelling operation and means for releasing said locking means.

T. A. JOHNSON.
J. THOMPSON.
CHARLES G. R. McHARDY.